(12) United States Patent
Fukuda et al.

(10) Patent No.: US 11,267,187 B2
(45) Date of Patent: Mar. 8, 2022

(54) DIE, MANUFACTURING METHOD THEREFOR, AND MOLDED BODY MANUFACTURING METHOD

(71) Applicant: KYORAKU CO., LTD., Kyoto (JP)

(72) Inventors: Tatsuya Fukuda, Kanagawa (JP); Yuki Harasawa, Kanagawa (JP); Ryosuke Oki, Aichi (JP)

(73) Assignee: KYORAKU CO., LTD., Kyoto (JP)

( * ) Notice: Subject to any disclaimer, the term of this patent is extended or adjusted under 35 U.S.C. 154(b) by 43 days.

(21) Appl. No.: 16/333,014

(22) PCT Filed: Sep. 22, 2017

(86) PCT No.: PCT/JP2017/034276
§ 371 (c)(1),
(2) Date: Mar. 13, 2019

(87) PCT Pub. No.: WO2018/062034
PCT Pub. Date: Apr. 5, 2018

(65) Prior Publication Data
US 2019/0275728 A1    Sep. 12, 2019

(30) Foreign Application Priority Data
Sep. 29, 2016  (JP) .............................. JP2016-191927

(51) Int. Cl.
*B29C 51/36*  (2006.01)
*B29C 33/38*  (2006.01)
(Continued)

(52) U.S. Cl.
CPC .......... *B29C 51/36* (2013.01); *B29C 33/3842* (2013.01); *B29C 51/02* (2013.01);
(Continued)

(58) Field of Classification Search
CPC ... B29C 2791/006; B29C 51/10; B29C 51/36; B29C 33/42; B29C 33/424; B29C 33/426; B29C 48/0017; B29C 51/02; B29C 51/105; B29C 51/267
See application file for complete search history.

(56) References Cited

U.S. PATENT DOCUMENTS 3,253,069 A    5/1966  Holley et al.
4,423,000 A   12/1983  Teraoka
(Continued)

FOREIGN PATENT DOCUMENTS

CN   104837606 A    8/2015
DE     1194123 B    6/1965
(Continued)

OTHER PUBLICATIONS

Machine translation of JP2014014980A, Jan. 2014.*
(Continued)

*Primary Examiner* — Philip C Tucker
*Assistant Examiner* — Jimmy R Smith, Jr.
(74) *Attorney, Agent, or Firm* — Maier & Maier, PLLC

(57) ABSTRACT

A mold which can improve an appearance of a molded body is provided. A mold includes a cavity, the mold being capable of subjecting a resin sheet under reduced pressure suction via a plurality of reduced pressure suction holes thereby shaping the resin sheet to follow a shape of an inner surface of the cavity; wherein: the inner surface includes a base surface and a plurality of island-like concave portions provided in the base surface; and a concave portion reduced pressure suction hole index defined by an in-concave reduced pressure suction hole ratio divided by a concave portion area ratio is 0.5 or lower.

12 Claims, 13 Drawing Sheets

(51) Int. Cl.
  B29C 51/02   (2006.01)
  B29C 51/10   (2006.01)
  B29C 65/00   (2006.01)
  B29K 101/12      (2006.01)
  B29C 51/26       (2006.01)
  B29C 48/375      (2019.01)
  B29C 48/07       (2019.01)
  B29L 7/00        (2006.01)
  B29C 48/00       (2019.01)
  B23P 15/24       (2006.01)
  B29K 105/04      (2006.01)
  B29C 51/12       (2006.01)
  B29C 48/475      (2019.01)

(52) U.S. Cl.
  CPC ............ B29C 51/10 (2013.01); B29C 66/727 (2013.01); *B23P 15/24* (2013.01); *B29C 48/0017* (2019.02); *B29C 48/07* (2019.02); *B29C 48/388* (2019.02); *B29C 48/475* (2019.02); *B29C 51/105* (2013.01); *B29C 51/12* (2013.01); *B29C 51/267* (2013.01); *B29C 2791/006* (2013.01); *B29K 2101/12* (2013.01); *B29K 2105/04* (2013.01); *B29K 2995/0015* (2013.01); *B29L 2007/002* (2013.01)

(56) References Cited

U.S. PATENT DOCUMENTS 5,494,542 A * 2/1996 Muller .................... B29C 51/16
                                                    156/212

2008/0284053 A1* 11/2008 Dutouquet ............ B29C 33/424
                                                    264/102
2011/0303355 A1  12/2011 Sumi et al.
2015/0306844 A1  10/2015 Fukuda et al.
2018/0250911 A1   9/2018 Fukuda et al.

FOREIGN PATENT DOCUMENTS

| FR | 1525974 A |   | 5/1968  |              |
|----|-----------|---|---------|--------------|
| GB |  828663 A | * | 2/1960  | ............ B29C 70/28 |
| GB |  828663 A |   | 2/1960  |              |
| JP | S63-54231 A |  | 3/1988  |              |
| JP | 2000326343 A | * | 1/2000 | ........ B29C 44/146 |
| JP | 2000-326343 A |  | 11/2000 |          |
| JP | 2011-136523 A |  | 7/2011  |           |
| JP |  2014014980 A |  | 1/2014  |           |
| JP | 2014-128938 A |  | 7/2014  |           |
| JP |  2017-065104 A |  | 4/2017  |          |
| KR | 2000-0074440 A |  | 12/2000 |          |

OTHER PUBLICATIONS

Extended European Search Report dated Aug. 16, 2019, of corresponding European application No. 17855988.6; 9 pgs.
International Search Report dated Oct. 31, 2017 in corresponding International Application No. PCT/JP2017/034276; 5 pages.
Chinese Office Action dated Nov. 23, 2020, in corresponding Chinese Application No. 201780056892.9 (11 pp., including machine-generated English translation).
Korean Office Action dated May 31, 2021, in connection with corresponding Korean Application No. 10-2019-7011574 (11 pp., including machine-generated English translation).

* cited by examiner

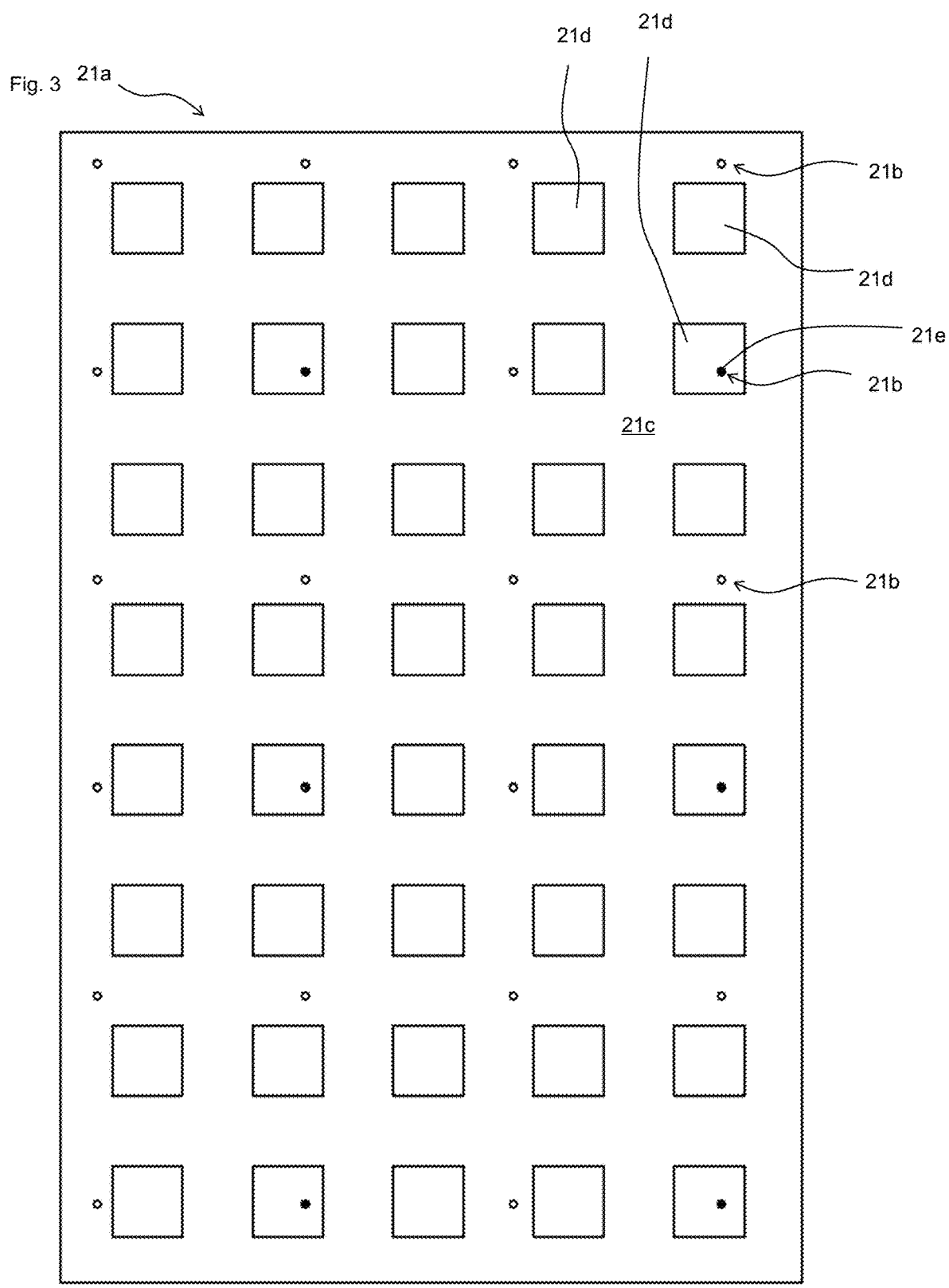

DIE, MANUFACTURING METHOD THEREFOR, AND MOLDED BODY MANUFACTURING METHOD

TECHNICAL FIELD

The present invention relates to a mold which can be used in vacuum molding, manufacturing method thereof, and to a method for manufacturing a molded body using the mold.

BACKGROUND

Patent Literature 1 discloses a method for manufacturing a resin panel by performing reduced pressure suction of a resin sheet with a mold, thereby shaping the resin sheet into the shape of the cavity of the mold, and then welding a foamed body onto the resin sheet.

CITATION LIST

Patent Literature

[Patent Literature 1] JP 2014-128938A

SUMMARY OF INVENTION

Summary of Invention

In the resin sheet such as those of Patent Literature 1, there are cases where a plurality of island-like convex portions (dimple form) are formed in view of design ability and functionality. In order to form such convex portion on the resin sheet, a concave portion having a shape corresponding to the convex portion need be formed on the mold. However, when resin sheet is subjected to reduced pressure suction by such mold having the concave portion formed thereon, the shaping property of the resin sheet at the concave portion and vicinity thereof is unsatisfactory. As a result, the appearance of the molded body can be unsatisfactory.

The present invention has been made by taking the afore-mentioned circumstances into consideration. The present invention provides a mold which can improve the appearance of a molded body.

According to the present invention, a mold comprising a cavity, the mold being capable of subjecting a resin sheet under reduced pressure suction via a plurality of reduced pressure suction holes thereby shaping the resin sheet to follow a shape of an inner surface of the cavity; wherein: the inner surface comprises a base surface and a plurality of island-like concave portions provided in the base surface; and a concave portion reduced pressure suction hole index defined by an in-concave reduced pressure suction hole ratio divided by a concave portion area ratio is 0.5 or lower, is provided. (Here, the in-concave reduced pressure suction hole ratio, which is defined by a ratio of number of reduced pressure suction holes that are capable of performing reduced pressure suction existing in the concave portions with respect to a sum of number of reduced pressure suction holes that are capable of performing reduced pressure suction existing in either one of the base surface and the concave portions, and the concave portion area ratio, which is defined by a ratio of an area of the concave portions with respect to sum of areas of the base surface and the concave portions.)

By conducting a study on the cause of unsatisfactory shaping property at the concave portions and vicinity thereof, it became apparent that shaping property was unsatisfactory at portions where the reduced pressure suction holes are provided in the concave portions. Further, in accordance with such findings, when the reduced pressure suction holes in the concave portions were blocked, it was confirmed that the shaping property at the concave portions and vicinity thereof had improved. Accordingly, the inventors confirmed that the cause of degraded shaping property was the existence of the reduced pressure suction holes in the concave portions, and found that the appearance of the molded body can be improved by controlling the concave portion reduced pressure suction hole index at or below 0.5, thereby leading to completion of the present invention.

Hereinafter, various embodiments of the present invention will be described. The embodiments described hereinafter can be combined with each other.

Preferably, the reduced pressure suction holes are provided in the concave portions, and the reduced pressure suction holes in the concave portions are blocked.

Preferably, the area ratio of concave portion s is 1 to 80%.

Preferably, the concave portions are regularly dispersed.

Preferably, a number of the reduced pressure suction holes/number of the concave portions is 0.1 to 10.

Preferably, an area per one concave portion is 2 to 900 mm$^2$.

Preferably, the concave portions have a depth of 0.1 to 10 mm.

Preferably, an area per one reduced pressure suction hole is 0.001 to 1 mm$^2$.

Preferably, wrinkles are provided on the base surface.

According to another aspect of the present invention, a method for manufacturing a mold, comprising the steps of: a reduced pressure suction hole forming step to form a plurality of reduced pressure suction holes on a base surface of a cavity; a concave portion forming step to form a plurality of concave portions on the base surface; and a blocking step to block the reduced pressure suction holes which exist in the concave portions, is provided.

According to another further aspect of the present invention, a method for manufacturing a molded body, comprising a step of: a shaping step to shape a resin sheet to follow a shape of an inner surface of the cavity by subjecting the resin sheet to a reduced pressure suction by the afore-mentioned mold, is provided.

Preferably, the resin sheet is formed by extruding and dangling a molten resin from a slit.

Preferably, the method further comprises a welding step after the shaping step to weld a foamed body on the resin sheet.

BRIEF DESCRIPTION OF THE DRAWINGS

FIG. 3 is a plan view of inner surface of cavity 21*a* of the mold 21 of FIGS. 2*a* and 2*b*.

FIG. 5 shows a manufacturing process of the mold 21 following the process of FIG. 4, which is a plan view corresponding to FIG. 3, showing a condition after forming concave portions 21d on the base surface 21c of the cavity 21a.

FIG. 7 is a sectional view corresponding to FIG. 2a, showing a condition after the resin sheets 23 and 24 are subjected to reduced pressure suction by the molds 21 and 22 of FIG. 2a.

DETAILED DESCRIPTION

Figure 1:
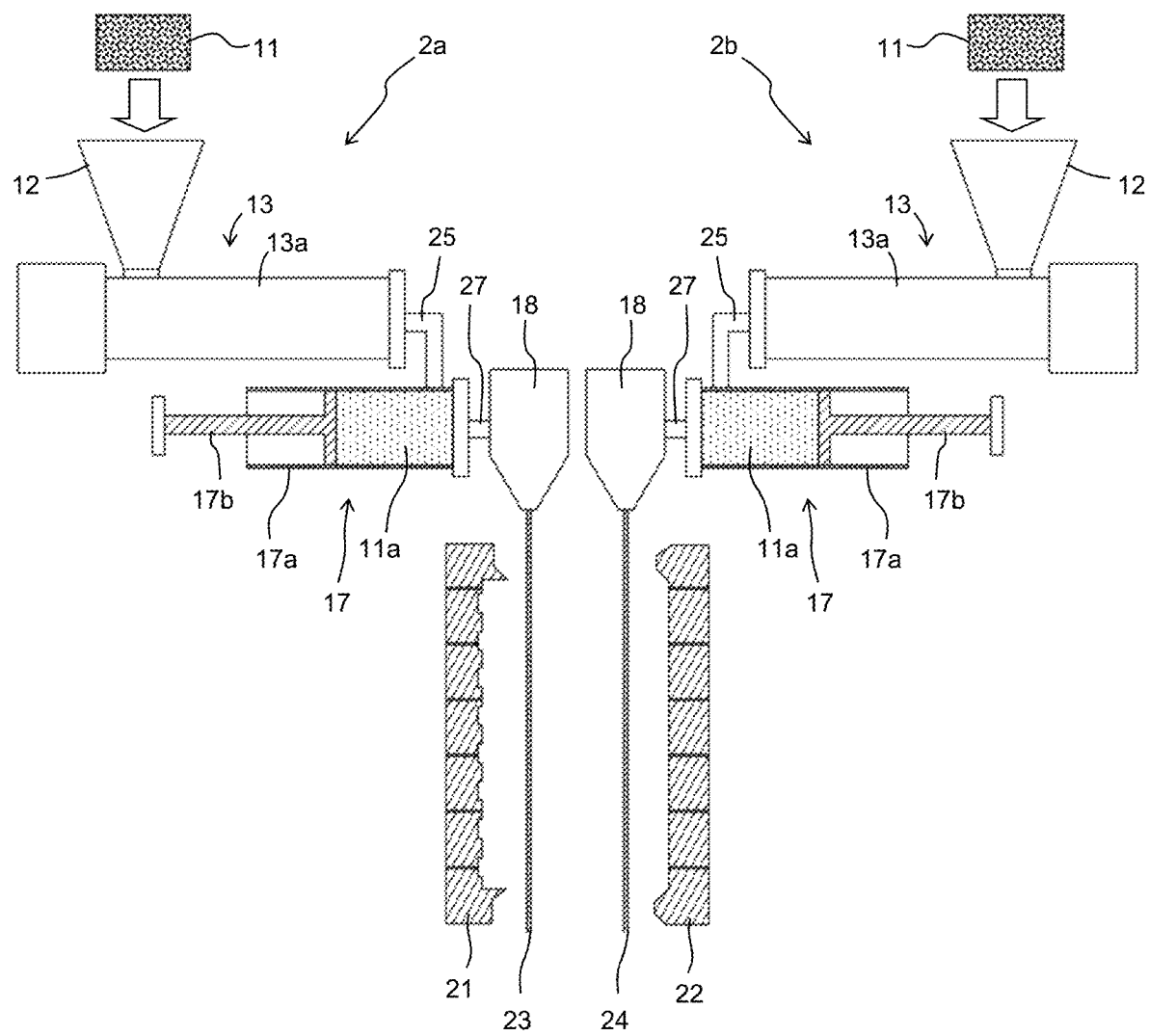
FIG. 1 shows a one example of a molding machine 1 which can be used in the manufacturing method of the molded body according to one embodiment of the present invention.

Hereinafter, various embodiments of the present invention will be described. Various distinctive features shown in the following embodiments can be combined with each other. In addition, an invention can be established independently for each of the distinctive features.

1. Configuration of Molding Machine 1

First, with reference to FIG. 1 to FIG. 6, the molding machine 1 which can be used in carrying out the manufacturing method of the molded body of one embodiment of the present invention will be explained. The molding machine 1 comprises resin sheet forming devices 2a and 2b, and molds 21 and 22. Each of the resin sheet molding devices 2a and 2b comprises a hopper 12, an extruder 13, an accumulator 17, and a T-die 18. The extruder 13 and the accumulator 17 are connected via a connecting tube 25. The accumulator 17 and the T-die 18 are connected via a connecting tube 27.

Hereinafter, each of the configuration is explained in detail.

<Hopper 12, Extruder 13>

The hopper 12 is used to charge the raw material resin 11 into the cylinder 13a of the extruder 13. There is no particular limitation regarding the form of the raw material resin 11, however, it is usually a pellet. The raw material resin is, for example, a thermoplastic resin such as polyolefin. As the polyolefin, low density polyethylene, linear low density polyethylene, high density polyethylene, polypropylene, ethylene-propylene copolymer, and mixtures thereof can be mentioned. After the raw material resin 11 is charged from the hopper 12 into the cylinder 13a, the raw material resin 11 is heated in the cylinder 13a, thereby melting to give a molten resin. Here, the molten resin is transferred towards the tip of the cylinder 13a by the rotation of a screw arranged in the cylinder 13a. The screw is arranged in the cylinder 13a, and the rotation thereof allows to knead and transfer the molten resin. At the rear anchor of the screw, a gear device is provided to rotationally drive the screw. The number of screws arranged in the cylinder 13a can be one and can be two or more.

<Accumulator 17, T-die 18>

The molten resin is extruded from the resin extruding opening of the cylinder 13a, and then injected into the accumulator 17 via the connecting tube 25. The accumulator 17 is provided with a cylinder 17a and a piston 17b, the piston 17b capable of sliding in the cylinder 17a. The molten resin can be contained in the cylinder 17a. By moving the piston 17b after a prescribed amount of the molten resin is contained in the cylinder 17a, the molten resin is extruded from the slit provided in the T-die 18 via the connecting tube 27, thereby dangling the molten resin to form the resin sheets 23 and 24.

<Molds 21 and 22>

Figure 2A:
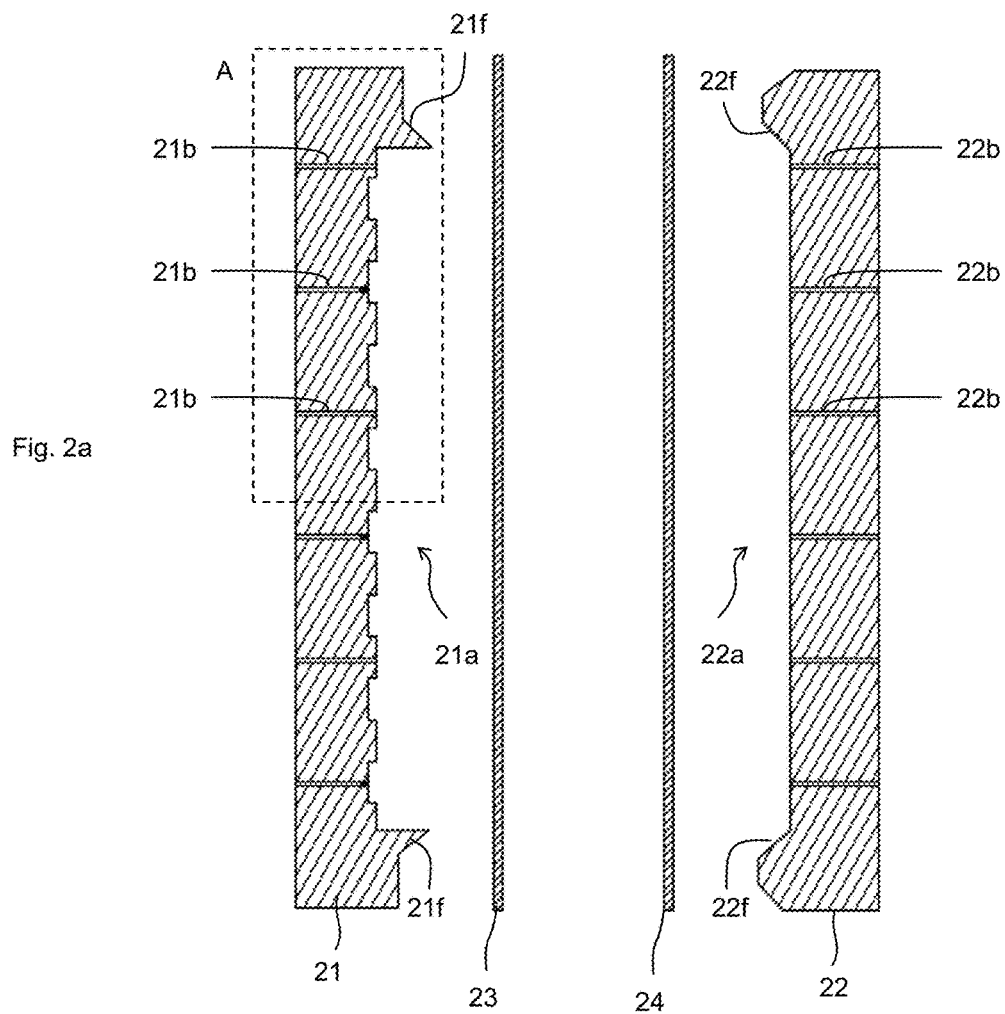
FIG. 2*a* is an enlarged sectional view of the vicinity of the molds 21 and 22, and the resin sheets 23 and 24 of FIG. 1.
Figure 2B:
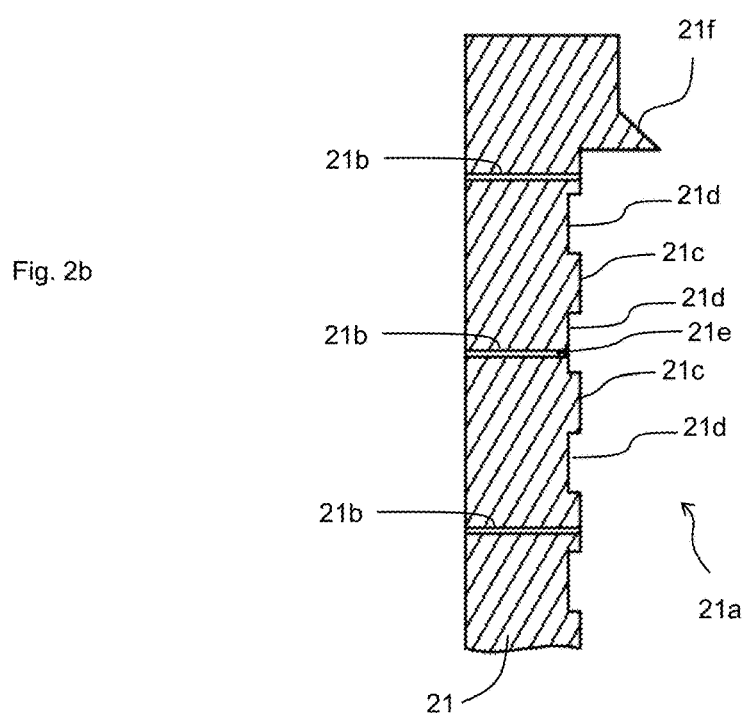
FIG. 2*b* is an enlarged view of region A in FIG. 2*a*.

The resin sheets 23 and 24 are introduced between the molds 21 and 22. As shown in FIG. 2 to FIG. 3, the molds 21 and 22 are provided with cavities 21a and 22a respectively, and pinch off portions 21f and 22f are provided to surround the cavities 21a and 22a respectively. In the cavities 21a and 22a, reduced pressure suction holes 21b and 22b are provided respectively. The resin sheets 23 and 24 can be subjected to reduced pressure suction via the reduced pressure suction holes 21b and 22b to shape the resin sheets 23 and 24 to follow the shape of the inner surface of the cavities 21a and 22a of the molds 21 and 22, respectively. The reduced pressure suction holes 21b and 22b are fine holes, which penetrates inside the molds 21 and 22 to allow one end of the hole to reach the inner surface of the cavities 21a and 22a, and the other end to connect with a decompression device. The area of the reduced pressure suction hole 21b and 22b is 0.001 to 1 mm$^2$ for example. The area is, particularly for example, 0.001, 0.01, 0.05, 0.1, 0.5, or 1 mm$^2$, and can be in the range between the two values exemplified herein. The number density of the reduced pressure suction holes 21b and 22b is 0.1 to 10 holes/cm$^2$ for example. The number density is, particularly for example, 0.1, 0.5, 1, 5, or 10 holes/cm$^2$, and can be in the range between the two values exemplified herein. The reduced pressure suction holes 21b and 22b are preferably circular, however, can have a different shape. The reduced pressure suction holes 21b and 22b are preferably regularly (preferably uniformly) dispersed. In addition, the reduced pressure suction holes 21b and 22b are preferably provided in a latticed pattern.

The inner surface of the cavity 21a comprises a base surface 21c, and a plurality of island-like convex portions 21d provided in the base surface 21c. The concave portions 21d are provided to form convex portions on the molded body to improve appearance and functionality. The concave portions 21d are preferably regularly (preferably uniformly) dispersed. The depth of the concave portion 21d is 0.1 to 10 mm for example, and the depth is especially preferably 0.1 to 1 mm since improvement in appearance is prominent in such range. The depth of the concave portion 21d is, particularly for example, 0.1, 0.2, 0.3, 0.4, 0.5, 0.6, 0.7, 0.8, 0.9, 1, 2, 3, 4, 5, 6, 7, 8, 9, or 10 mm, and can be in the range between the two values exemplified herein.

The area per one concave portion 21d is 2 to 900 mm$^2$ for example, preferably 10 to 100 mm$^2$. The area per one concave portion 21d is, particularly for example, 2, 5, 10, 20, 30, 40, 50, 60, 70, 80, 90, 100, 500, or 900 mm$^2$, and can be in the range between the two values exemplified herein. As the shape of the concave portions 21*d*, circular shape, polygonal shape (square for example), and the like can be mentioned. The concave portions 21*d* are preferably provided in a latticed pattern. When the length of one side or the diameter of the circle of the concave portion is taken as L, the distance between the adjacent concave portion 21*d* is preferably 1.5 L to 5 L. The distance is, for example, 1.5 L, 2 L, 2.5 L, 3 L, 3.5 L, 4 L, 4.5 L, or 5 L, and can be in the range between the two values exemplified herein. L is preferably 1.5 to 30 mm, more preferably 3 to 10 mm. L is, particularly for example, 1.5, 2, 5, 10, 15, 20, 25, or 30 mm, and can be in the range between the two values exemplified herein.

The number of reduced pressure suction holes 21*b*/number of concave portions 21*d* is 0.1 to 10 for example, preferably 0.3 to 3. The number of reduced pressure suction holes 21*b*/number of concave portions 21*d* is, particularly for example, 0.1, 0.2, 0.3, 0.4, 0.5, 0.6, 0.7, 0.8, 1, 2, 3, 4, 5, 6, 7, 8, 9, or 10, and can be in the range between the two values exemplified herein.

When the concave portion area ratio A is defined by formula 1, the concave portion area ratio A is 1 to 80% for example, preferably 10 to 50%. The ratio A is, particularly for example, 1, 10, 20, 30, 40, 50, 60, 70, or 80, and can be in the range between the two values exemplified herein. In the Example shown in FIG. 4, a square having a length of one side being L is arranged in a latticed pattern with a pitch of 2 L. Accordingly, the ratio of the area of concave portions 21*d* is 25%. (formula 1) concave portion area ratio A=ratio of the area of concave portions 21*d* with respect to the sum of the areas of the base surface 21*c* and the concave portions 21*d*

The side surface of the concave portions 21*d* can be substantially vertical with respect to the base surface 21*c* or can be inclined with respect to the base surface 21*c*. The base surface 21*c* is preferably a flat surface, however, it can also be curved. Wrinkles can be provided on the base surface 21*c*. When wrinkles are provided on the base surface 21*c*, the bottom face of the concave portions 21*d* need not be provided with the wrinkles.

When the ratio of reduced pressure suction holes in concave portion B is defined by formula 2, in a condition where the reduced pressure suction holes 21*b* and the concave portions 21*d* are arranged with no correlation and all of the reduced pressure suction holes 21*b* are not blocked and are capable of performing reduced pressure suction, the ratio of reduced pressure suction holes in concave portion B becomes substantially equal to the concave portion area ratio A. Here, in formula 2, the reduced pressure suction holes 21*b* that are capable of performing reduced pressure suction refer to reduced pressure suction holes 21*b* that are not blocked and are capable of performing reduced pressure suction. The reduced pressure suction holes 21*b* that are blocked and are unable to perform reduced pressure suction are not counted.

(formula 2) ratio of reduced pressure suction holes in concave portion B=ratio of number of reduced pressure suction holes 21*b* that are capable of performing reduced pressure suction existing in concave portions 21*d* with respect to the sum of number of reduced pressure suction holes 21*b* that are capable of performing reduced pressure suction existing in either one of the base surface 21*c* and the concave portions 21*d*

In such case, when the concave portion reduced pressure suction hole index C is defined by formula 3, the concave portion reduced pressure suction hole index becomes substantially equal to 1.

concave portion reduced pressure suction hole index C=ratio of reduced pressure suction holes in concave portion B/concave portion area ratio A (formula 3)

Here, when the present inventors were developing a resin panel having a plurality of island-like convex portions arranged thereon, they have found that molding defects frequently occur at the convex portions and its surroundings, and have also found that the cause thereof is the existence of reduced pressure suction holes in the concave portions of the mold corresponding to the convex portions. According to such finding, the inventors have blocked the reduced pressure suction holes 21*b* in the concave portions 21*d*, thereby confirming that the shaping property at the concave portions 21*d* and its surroundings were improved. Taking such viewpoint into consideration, it is preferable that there is no reduced pressure suction hole 21*b* which is capable to perform reduced pressure suction in the concave portions 21*d*. However, there are cases where existence of reduced pressure suction holes 21*b* that are capable of performing reduced pressure suction in some of the concave portions 21*d* is acceptable. Accordingly, in the present embodiment, the concave portion reduced pressure suction hole index C is regulated to 0.5 or lower. When the reduced pressure suction holes 21*b* and the concave portions 21*d* are arranged without any correlation, the index C is approximately 1. Accordingly, by regulating the index C to 0.5 or lower, shaping property is improved at many of the concave portions 21*d*, and thus the appearance of the molded body is improved as a whole. The index C is preferably 0.4, 0.3, 0.2, 0.1, or 0.05 or lower, and 0 is most preferable. Here, the mechanism for degradation of the shaping property when reduced pressure suction holes 21*b* exist in the concave portions 21*d* is not fully understood. It is deduced that when the resin sheet 23 is drawn into the concave portions 21*d* by the reduced pressure suction through the reduced pressure suction holes 21*b* in the concave portions 21*d*, the resin sheet 23 is cooled by coming into contact with the rim of the concave portions 21*d*, and this temperature drop is related to the degradation of the shaping property.

Figure 6:
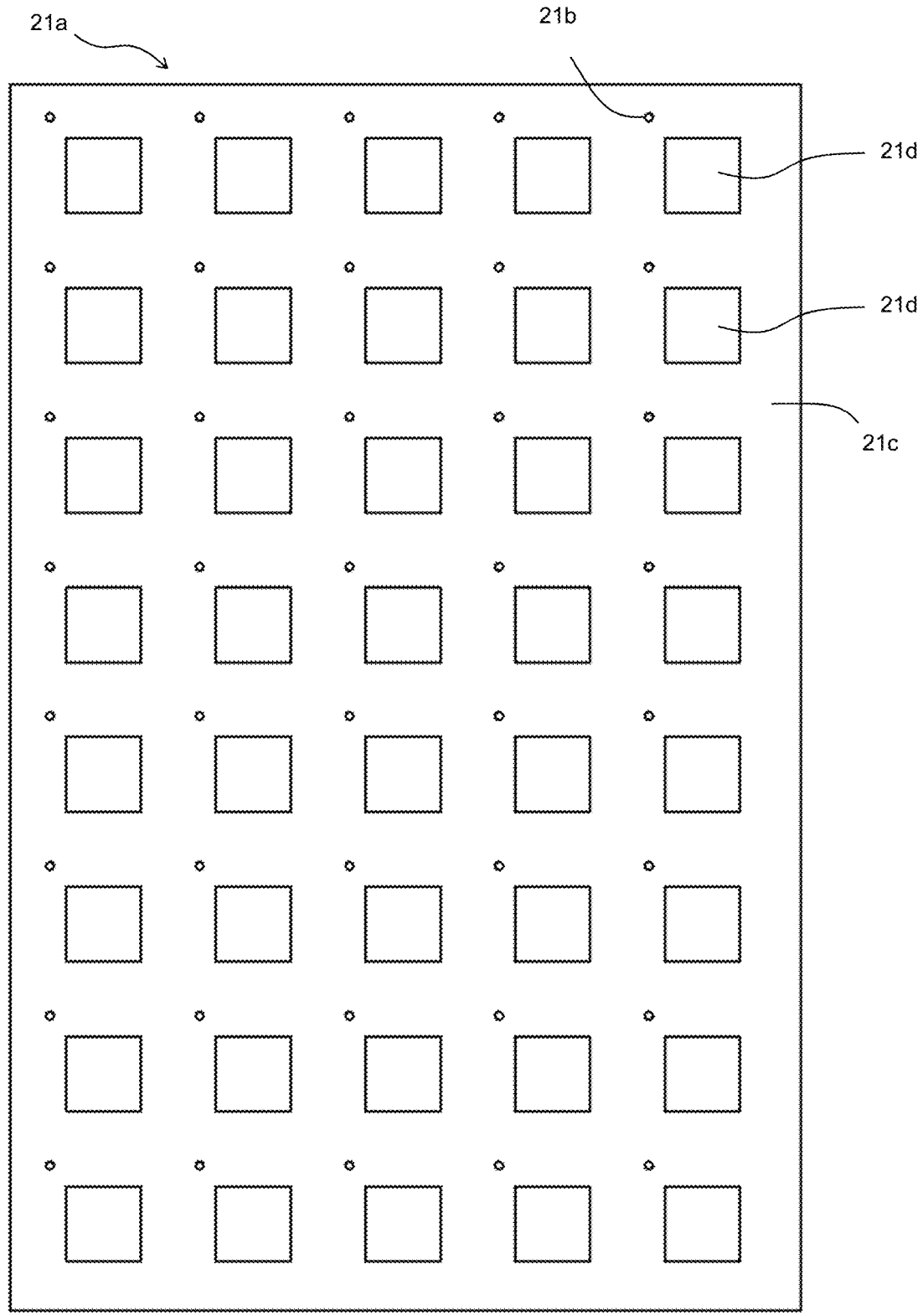
FIG. 6 is a plan view corresponding to FIG. 3, showing a configuration in which the reduced pressure suction holes 21b and the concave portions 21d are arranged so that the reduced pressure suction holes 21b would not be arranged in the concave portions 21d.

In order to reduce index C, ratio B should be reduced. As a measure to reduce ratio B, a measure in which the reduced pressure suction holes 21*b* existing in the concave portions 21*d* are blocked by a blocking member 21*e*, thereby placing the reduced pressure suction holes 21*b* in a condition not capable of performing reduced pressure suction, and a measure to arrange the positions of the concave portions 21*d* and the reduced pressure suction holes 21*b* so that the reduced pressure suction holes 21*b* would not be arranged in the concave portions 21*d*, can be mentioned. In the embodiment of FIG. 3, the reduced pressure suction holes 21*b* existing in the concave portions 21*d* are blocked by the blocking member 21*e*. In the embodiment of FIG. 6, the concave portions 21*d* and the reduced pressure suction holes 21*b* are arranged with the same pitch, thereby arranging the reduced pressure suction holes 21*b* so as not to come in the concave portions 21*d*. Here, even with the constitution in which the value of pitch of concave portions 21*d*/pitch of reduced pressure suction holes 21*b* takes an integral number of 2, 3, 4, or 5, the reduced pressure suction holes 21*b* can be arranged so as not to be arranged in the concave portions 21*d*.

Here, the manufacturing method of the mold 21 will be explained. The mold is formed by a reduced pressure suction hole forming step, a concave portion forming step, and a blocking step.

Figure 4:
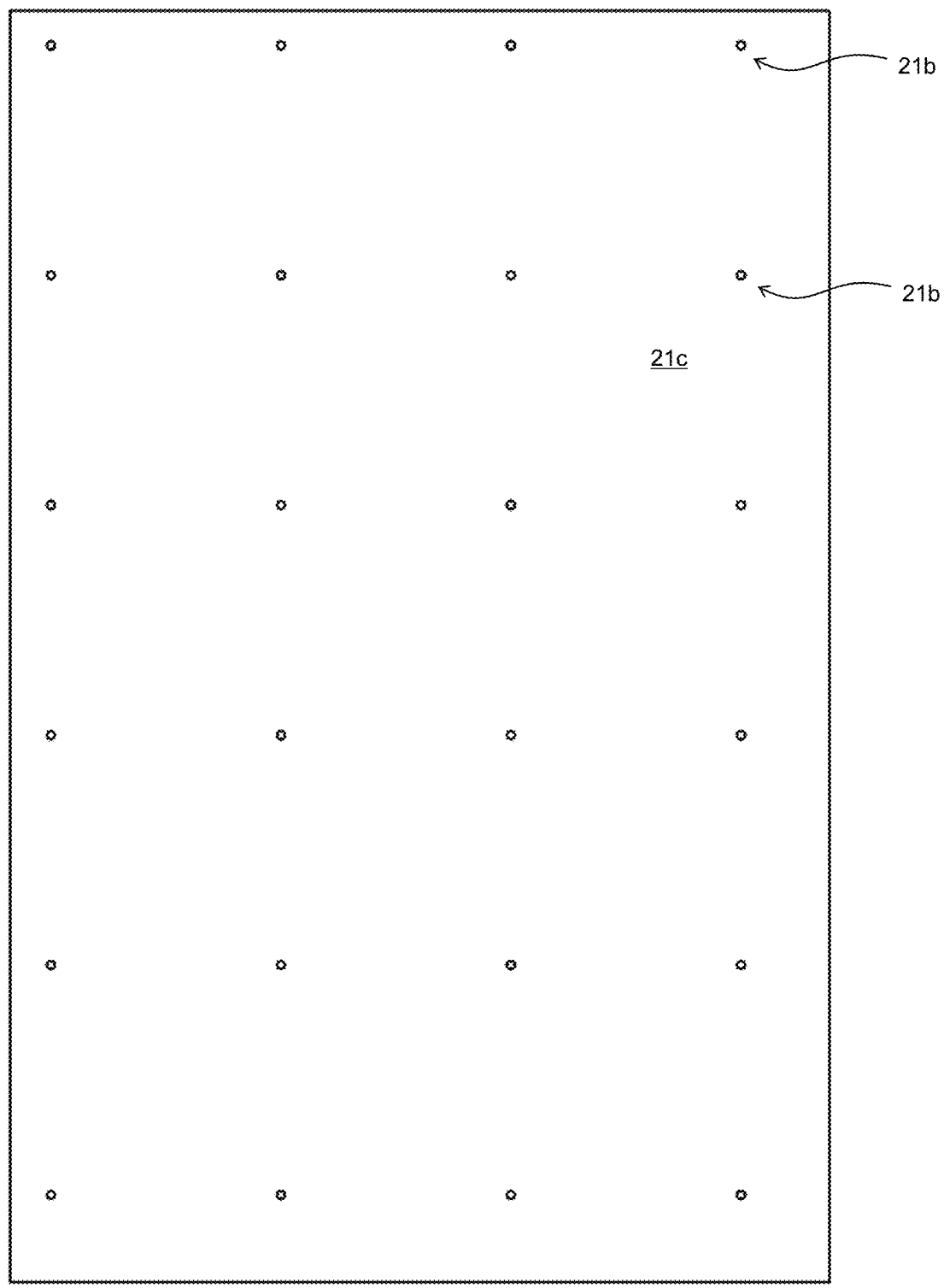
FIG. 4 shows a manufacturing process of the mold 21, which is a plan view corresponding to FIG. 3, showing a condition after forming the reduced pressure suction holes 21*b* on a base surface 21*c* of the cavity 21*a*.

First, in the reduced pressure suction hole forming step, as shown in FIG. 4, a plurality of reduced pressure suction holes 21b are formed on the base surface 21c of the cavity 21a. In one example, the reduced pressure suction holes 21b are arranged so as to be uniformly dispersed, without taking the position of the concave portions 21d into consideration. Generally, since the reduced pressure suction holes 21b are extremely small, existence or non-existence of the reduced pressure suction holes 21b in the concave portions 21d is not considered to influence the shaping property. Accordingly, in a usual manufacturing method of the mold 21, the reduced pressure suction holes 21b are arranged so as to be uniformly dispersed, without taking the position of the concave portions 21d into consideration.

Figure 5:
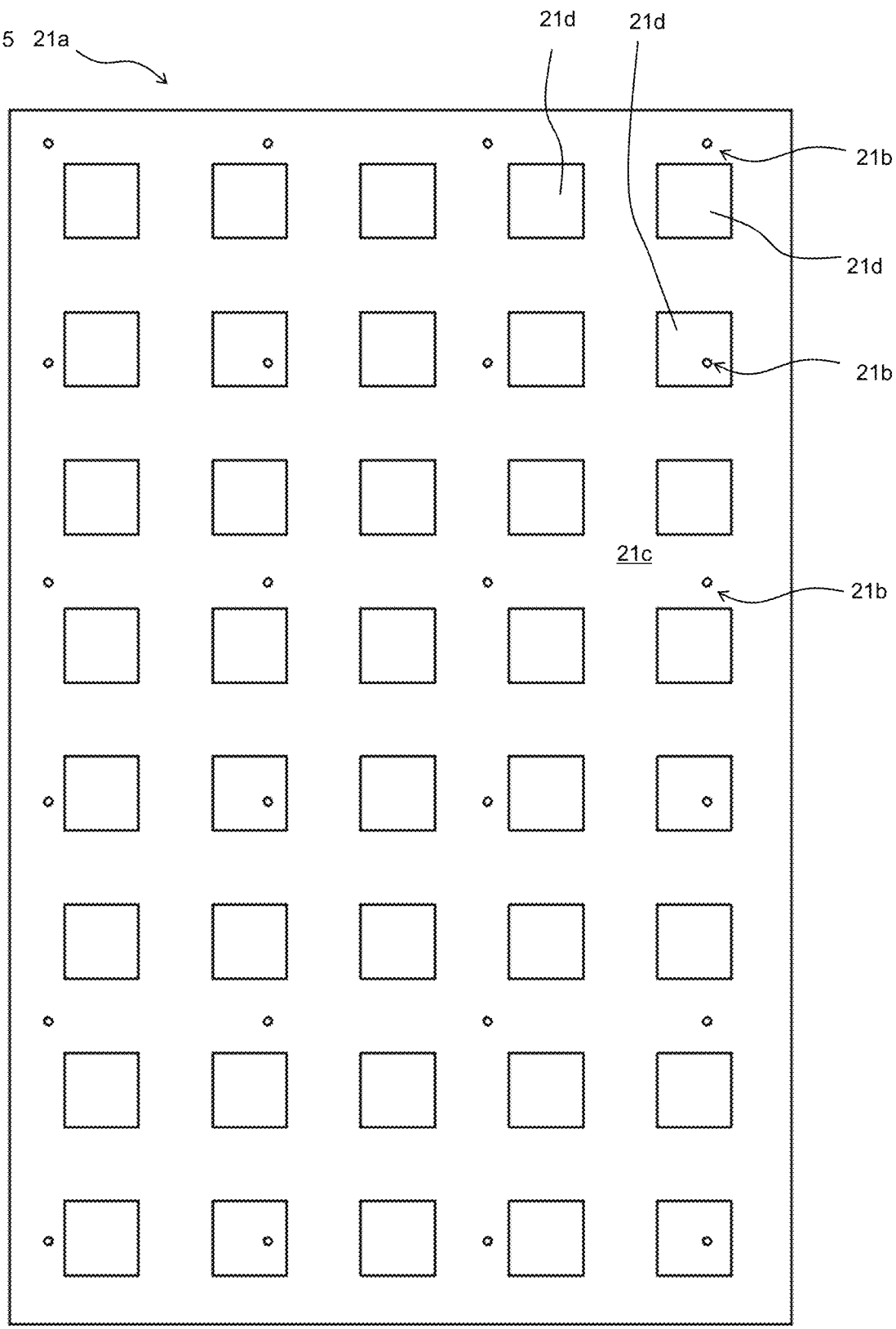

Subsequently, in the concave portion forming step, as shown in FIG. 5, a plurality of concave portions 21d are formed on the base surface 21c. The concave portions 21d can be formed by chemical measures such as etching the like and can be formed by physical measures such as mechanical processing and the like. In one example, the concave portions 21d are formed without taking the position of the reduced pressure suction holes 21b into consideration. In such case, the reduced pressure suction holes 21b are formed in the concave portions 21d with a similar ratio as the concave portion area ratio A.

Subsequently, in the blocking step, the reduced pressure suction holes 21b in the concave portions 21d are blocked by blocking members 21e to obtain a mold having the configuration shown in FIG. 3, thereby completing the manufacturing method of the mold. As the measure to block the reduced pressure suction holes 21b, a measure to pour a blocking material such as a resin, metal and the like into the reduced pressure suction holes 21b can be mentioned.

In a case where wrinkles are formed on the base surface 21C, a step to form wrinkles on the base surface 21c should be carried out before or after either one of the aforementioned steps. This step can be performed by a chemical measure such as etching and the like.

Here, when a mold having the configuration shown in FIG. 6 is manufactured, the reduced pressure suction holes 21b and the concave portions 21d can be formed so that the reduced pressure suction holes 21b would not exist in the concave portions 21d. In such case, the blocking step is not necessary.

2. Manufacturing Method of Molded Body

Here, with reference to FIG. 2 and FIG. 7 to FIG. 10, the manufacturing method of the molded body according to one embodiment of the present invention will be explained. The method of the present embodiment comprises an arranging step, a shaping step, a welding step, a mold clamping step, and a finishing step. Detailed explanation will be given hereinafter.

2.1 Arranging Step

In this step, as shown in FIG. 2, resin sheets 23 and 24 are arranged between the molds 21 and 22, the resin sheets 23 and 24 being formed by extruding and dangling a molten resin from the slit of the T-dies 18. In the present embodiment, a direct vacuum forming which uses the resin sheets 23 and 24 as extruded from the T-dies 18 is performed. Accordingly, the resin sheets 23 and 24 would not solidify due to being cooled to room temperature before forming, and heating of the solidified resin sheets 23 and 24 before forming would not be performed. Here, the resin sheets 23 and 24 of the present embodiment has a substantially uniform temperature immediately after being extruded from the slit, and is then gradually cooled from its surface by the atmosphere during dangling. Accordingly, influence of the atmosphere to cool the resin sheets 23 and 24 becomes small towards the center of the resin sheets 23 and 24 in the thickness direction. Therefore, the resin sheets 23 and 24 of the present embodiment has higher temperature and lower viscosity towards the center of the resin sheets 23 and 24 in the thickness direction. The thickness of the resin sheets 23 and 24 are not particularly limited, and is 0.5 to 5 mm for example, preferably 1 to 3 mm. The thickness is, particularly for example, 0.5, 1, 1.5, 2, 2.5, 3, 3.5, 4, 4.5, or 5 mm, and can be in the range between the two values exemplified herein.

2.2 Shaping Step

Figure 7:
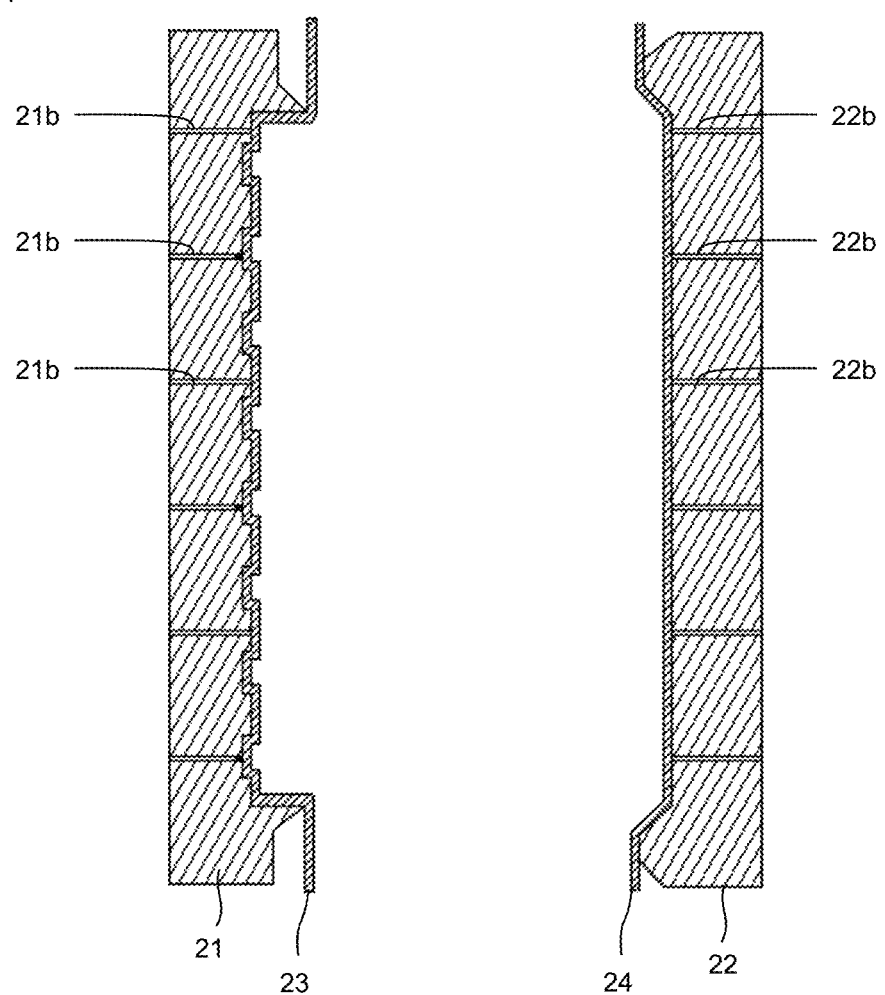

In this step, as shown in FIG. 7, the resin sheets 23 and 24 are subjected to reduced pressure suction by the molds 21 and 22, thereby shaping the resin sheets 23 and 24 to follow the shape of the cavities 21a and 22a. Since the mold 21 used in the present embodiment has a concave portion reduced pressure suction hole index of 0.5 or lower, degradation of shaping property at the concave portions 21d and its surroundings is suppressed.

2.3 Welding Step

Figure 8:
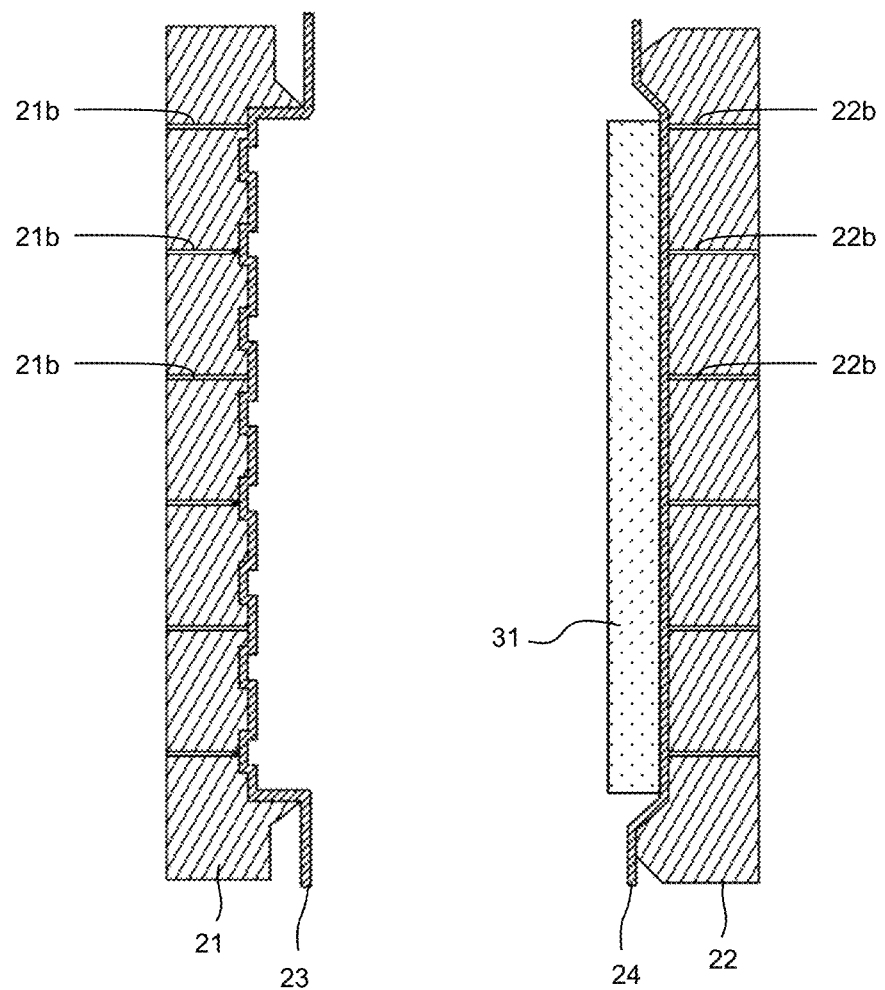
FIG. 8 is a sectional view corresponding to FIG. 2a, showing a condition after welding a foamed body 31 onto the resin sheet 24 of FIG. 7.

In this step, as shown in FIG. 8, the foamed body 31 is welded onto the resin sheet 24. The foamed body 31 can also be welded onto the resin sheet 23. The foamed body 31 is formed using a thermoplastic resin for example. The resin material thereof is not particularly limited, and is for example either one of polyolefin such as polypropylene, polyamide, polystyrene, and acrylic derivative such as polyvinyl chloride, or a mixture of two or more of these. The expansion ratio of the foamed body 31 is preferably 1.5 times to 6 times. Here, the foamed body 31 can be omitted, and in such case, the welding step can also be omitted.

2.4 Mold Clamping Step

Figure 9:
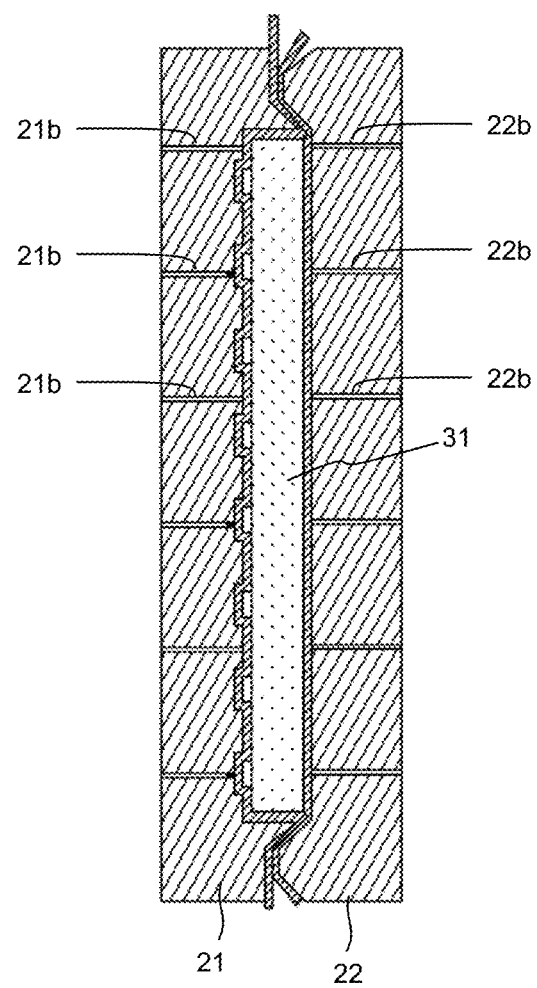
FIG. 9 is a sectional view corresponding to FIG. 2a, showing a condition after mold clamping the molds 21 and 22 of FIG. 8.

In this step, as shown in FIG. 9, the molds 21 and 22 are subjected to mold clamping. By performing this step, a molded body having resin sheets 23 and 24 welded on the foamed body 31 is obtained. That is, a molded body having the surroundings of the foamed body 31 covered with the resin sheet is obtained. The outer portion of the pinch off portions 21f and 22f is the burr. Here, when air is blown into the space surrounded by the resin sheets 23 and 24, the expansion ratio of the foamed body 31 can decrease, which can be problematic. Accordingly, it is preferable not to blow the air in.

2.5 Finishing Step

Figure 10:
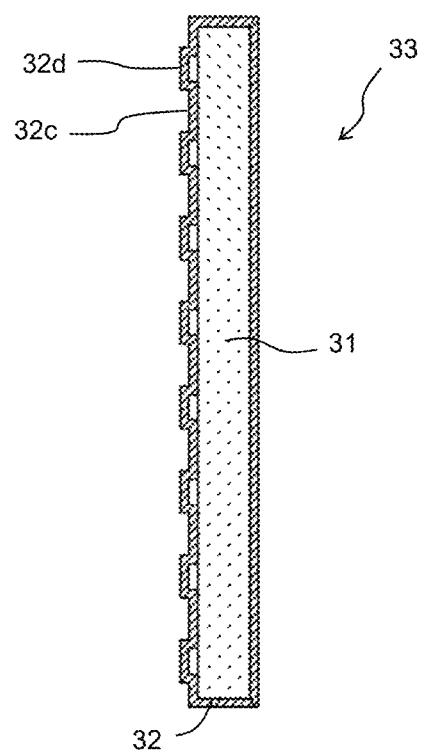
FIG. 10 is a sectional view showing a resin panel 33 obtained after removing a burr from the molded body formed in FIG. 9.

After the mold clamping step, the molds 21 and 22 are opened to take out the molded body, followed by removal of the burr, thereby obtaining the resin panel 33 shown in FIG. 10. The resin panel 33 has a configuration in which the surroundings of the foamed body 31 is covered with the resin sheet 32. To one side of the resin panel 33, concave portions 32c and convex portions 32d which correspond to the base surface 21 and the concave portions 21d respectively are formed. When wrinkles are provided on the base surface 21c, the wrinkles are transferred onto the concave portions 32c. When a mold provided with reduced pressure suction holes 21b in the concave portions 21d is used, transfer of the wrinkles can be insufficient, however in the present embodiment, since a mold having a concave portion reduced pressure suction hole index C of 0.5 or lower is used, the wrinkles are properly transferred, and thus a resin panel having superior appearance can be obtained.

EXAMPLES

Test Example 1

Using the molding machine 1 and the mold 21 shown in FIG. 1, vacuum molding was carried out. The inner diameter of the cylinder 13a of the extruder 13 was 50 mm, and equation of L/D=34 was satisfied. As the raw material resin, a material including PP and talc (20%), and carbon black (1%) was used. Temperature of each of the member was controlled so that the temperature of the resin sheet 23 would be in the range of 190 to 200° C. The rotation number of the screw was set to 60 rpm, and the extrusion amount was set to 20 kg/hr. T-die 18 was controlled so that the resin sheets 23 and 24 would have a thickness of 1 mm.

The resin sheet 23 formed by the afore-mentioned conditions was arranged adjacent to the mold 21. As the mold 21, the one having cylinder concave portions 21d arranged in a latticed pattern with a pitch of approximately 10 mm, the cylinder concave portion having a diameter of approximately 5 mm and a depth of approximately 0.2 to 0.3 mm, and wrinkles being provided on the base surface 21c was used. In the mold 21, one of the reduced pressure suction holes 21b is arranged in the concave portion 21d corresponding to the convex portion 32d identified by the arrow X in FIG. 11, and the rest of the reduced pressure suction holes 21b are arranged on the base surface 21c.

Subsequently, the resin sheet 23 was subjected to reduced pressure suction by the mold 21, thereby shaping the resin sheet 23 to follow the shape of the inner surface of the cavity of the mold 21.

Figure 11:
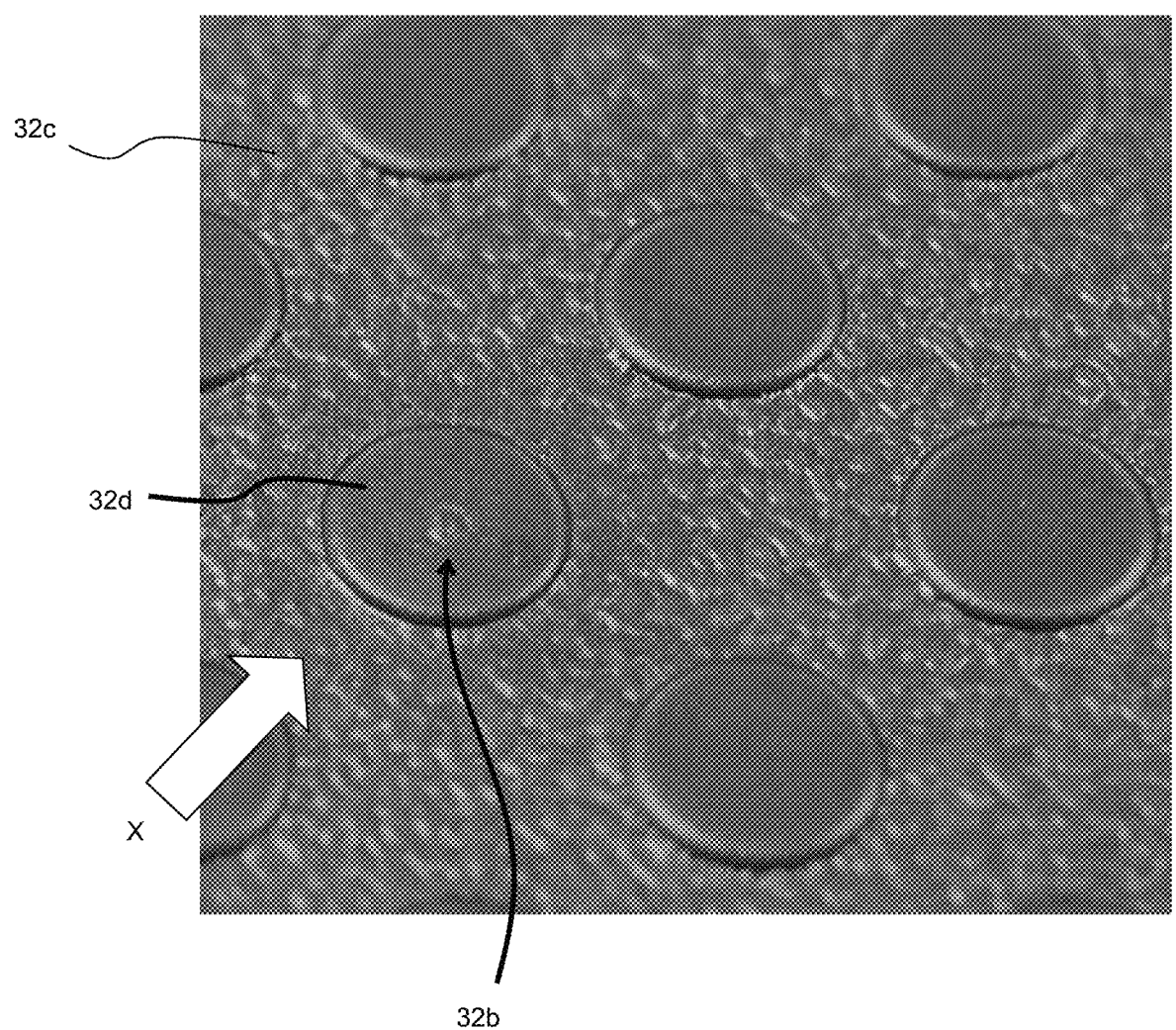
FIG. 11 is a photograph showing appearance of the molded body obtained by using the mold 21 in which the reduced pressure suction holes 21b in the concave portions 21d are not blocked, obtained in Test Example 1.

FIG. 11 shows a molded body obtained in a condition where the reduced pressure suction hole 21b in the concave portion 21d is not blocked. As shown in FIG. 11, an unintended projection 32b is formed at a portion corresponding to the reduced pressure suction hole 21b in the convex portion 32 identified by the arrow X. The wrinkles at the surroundings of the convex portion 32d is weaker than the wrinkles formed in other portions. Accordingly, it became apparent that the shaping property at the surroundings of the convex portion 32d is unsatisfactory.

Test Example 2

Figure 12:
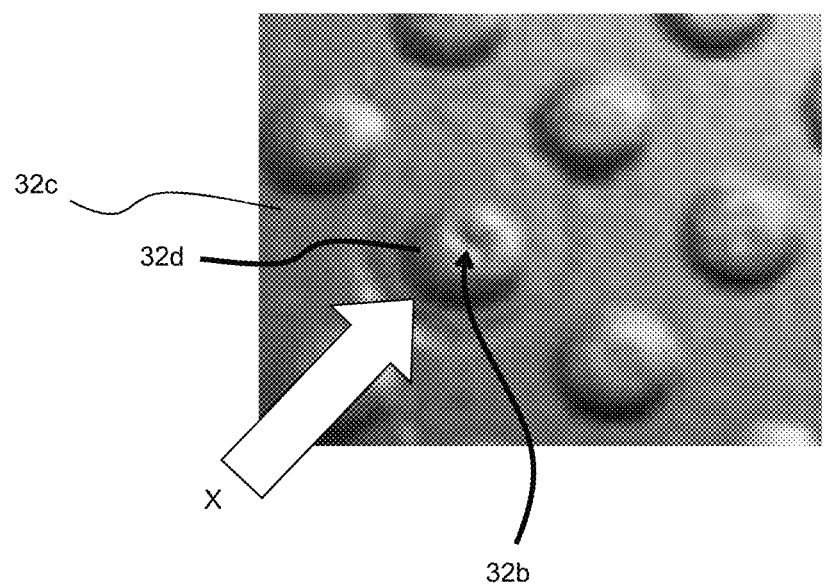
FIG. 12 is a photograph showing appearance of the molded body obtained by using the mold 21 in which the reduced pressure suction holes 21b in the concave portions 21d are not blocked, obtained in Test Example 2.

A molded body was formed with the same conditions as Test Example 1, except for using a mold 21 in which the cylinder concave portions 21d of the mold 21 of Test Example 1 was replaced with a spherical crown shaped concave portions 21d, the spherical crown shaped concave portion 21d having a diameter of approximately 2 mm at the rim of the concave portion 21d and a depth of approximately 0.2 to 0.3 mm. FIG. 12 shows a molded body obtained in a condition where the reduced pressure suction hole 21b in the concave portion 21d is not blocked. As shown in FIG. 12, an unintended projection 32b is formed at a portion corresponding to the reduced pressure suction hole 21b in the convex portion 32 identified by the arrow X. The surroundings of the convex portion 32d is dented than the other portions. Accordingly, it became apparent that the shaping property at the surroundings of the convex portion 32d is unsatisfactory.

Test Example 3

Figure 13:
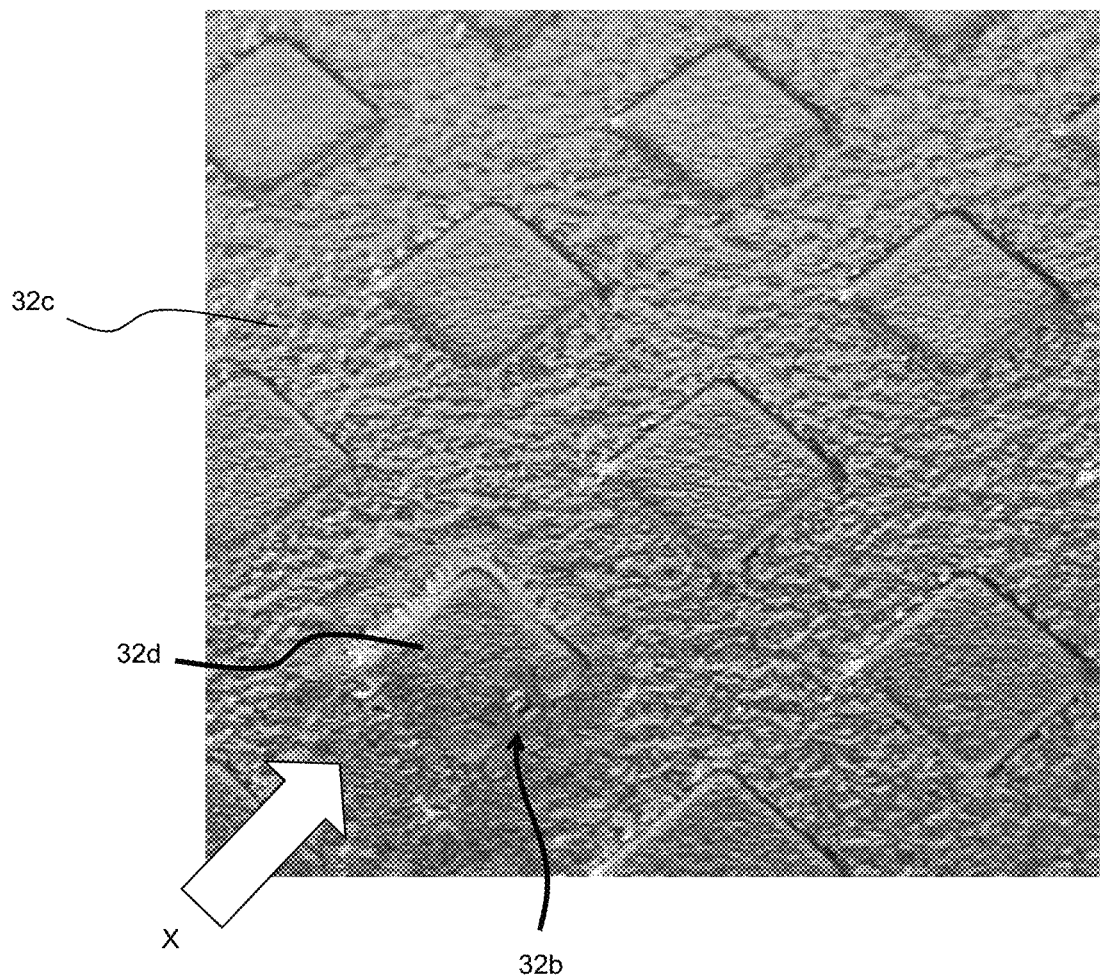
FIG. 13 is a photograph showing appearance of the molded body obtained by using the mold 21 in which the reduced pressure suction holes 21b in the concave portions 21d are not blocked, obtained in Test Example 3.

A molded body was formed with the same conditions as Test Example 1, except for using a mold 21 in which the cylinder concave portions 21d of the mold 21 of Test Example 1 was replaced with a tetragonal prism shaped concave portions 21d, the tetragonal prism shaped concave portion 21d having a side length of approximately 5 mm and a depth of approximately 0.2 to 0.3 mm. FIG. 13 shows a molded body obtained in a condition where the reduced pressure suction hole 21b in the concave portion 21d is not blocked. As shown in FIG. 13, an unintended projection 32b is formed at a portion corresponding to the reduced pressure suction hole 21b in the convex portion 32 identified by the arrow X. The surroundings of the convex portion 32d is dented than the other portions. Accordingly, it became apparent that the shaping property at the surroundings of the convex portion 32d is unsatisfactory.

Test Examples 4 to 6

In Test Examples 4 to 6, an instant adhesive was used to block the reduced pressure suction hole 21b in the concave portion 21d of the mold 21 according to Test Examples 1 to 3. Subsequently, the resin sheet 23 was subjected to the reduced pressure suction under similar conditions. Accordingly, convex portion 32d disappeared and the shaping property of the surroundings of the convex portion 32d was improved, thereby obtaining molded bodies having superior appearance.

EXPLANATION OF SYMBOLS

1: molding machine, 2a: first resin sheet molding device, 2b: second resin sheet molding device, 11: raw material resin, 12: hopper, 13: extruder, 13a: cylinder, 17: accumulator, 17a: cylinder, 17b: piston, 18: T-die, 21: first mold, 21a: cavity, 21b: reduced pressure suction holes 21c: base surface, 21d: concave portion, 21e: blocking member, 21f: pinch off portion, 22: second mold, 22a: cavity, 22b: reduced pressure suction holes, 22f: pinch off portion, 23: resin sheet, 24: resin sheet, 25: connecting tube, 27: connecting tube, 31: foamed body, 32: resin sheet, 32b: projection, 32c: concave portion, 32d: convex portion 33: resin panel

The invention claimed is:

1. A one-piece mold comprising a cavity, the one-piece mold having a unitary construction and being capable of subjecting a resin sheet to reduced pressure suction via a plurality of reduced pressure suction holes, each having an area of 0.001 to 1 mm$^2$, thereby shaping the resin sheet to follow a shape of an inner surface of the cavity;
  wherein the inner surface comprises a base surface and a plurality of island-like concave portions provided in the base surface; and
  a concave portion reduced pressure suction hole index defined by an in-concave reduced pressure suction hole ratio divided by a concave portion area ratio is 0.5 or lower, wherein
  the in-concave reduced pressure suction hole ratio is defined by a ratio of number of reduced pressure suction holes that are capable of performing reduced pressure suction existing in the concave portions with respect to a sum of number of reduced pressure suction holes that are capable of performing reduced pressure suction existing in both the base surface and the concave portions, and the concave portion area ratio is defined by a ratio of an area of the concave portions with respect to sum of areas of the base surface and the concave portions; and wherein some of the reduced pressure suction holes are provided in the concave portions, and at least one of the reduced pressure suction holes in the concave portions is blocked.

2. The mold of claim 1, wherein the concave portion area ratio is 1 to 80%.

3. The mold of claim 1, wherein the concave portions are regularly dispersed.

4. The mold of claim 1, wherein a ratio of the number of the reduced pressure suction holes divided by the number of the concave portions is 0.1 to 10.

5. The mold of claim 1, wherein the concave portions are concave portions each having an area of 2 to 900 mm$^2$.

6. The mold of claim 1, wherein the concave portions have a depth of 0.1 to 10 mm.

7. The mold of claim 1, wherein wrinkles are provided on the base surface.

8. A method for manufacturing the mold of claim 1, comprising the steps of:
a reduced pressure suction hole forming step to form the plurality of reduced pressure suction holes on the base surface of the cavity;
a concave portion forming step to form the plurality of concave portions in the base surface; and
a blocking step to block the reduced pressure suction holes which exist in the concave portions.

9. A method for manufacturing a molded body, comprising a step of:
a shaping step to, by use of the mold of claim 1, shape the resin sheet to follow the shape of the inner surface of the cavity by subjecting the resin sheet to reduced pressure suction.

10. The method of claim 9, wherein the resin sheet is formed by extruding and dangling a molten resin from a slit.

11. The method of claim 10, further comprising a welding step after the shaping step to weld a foamed body on the resin sheet.

12. The method of claim 9, further comprising a welding step after the shaping step to weld a foamed body on the resin sheet.

* * * * *